United States Patent [19]

Takenaka et al.

[11] Patent Number: 5,376,945
[45] Date of Patent: Dec. 27, 1994

[54] PORTABLE TERMINAL DEVICE

[75] Inventors: Toshihiro Takenaka, Nara; Yasuharu Tanaka, Shiki; Isamu Haneda, Soraku; Akitaka Morita, Shiki, all of Japan

[73] Assignee: Sharp Kabushiki Kaisha, Osaka, Japan

[21] Appl. No.: 872,429

[22] Filed: Apr. 23, 1992

[30] Foreign Application Priority Data

Apr. 26, 1991 [JP] Japan .................................. 3-097641

[51] Int. Cl.$^5$ .............................................. G09G 1/06
[52] U.S. Cl. .................................... 345/115; 345/173; 345/902
[58] Field of Search ............... 340/712, 709, 723, 747, 340/721, 724; 395/156, 157; 345/115, 112, 133, 146, 902, 145, 173

[56] References Cited

U.S. PATENT DOCUMENTS

| | | | |
|---|---|---|---|
| 4,686,522 | 8/1987 | Hernandez et al. | 340/721 |
| 4,701,752 | 10/1987 | Wang | 340/723 |
| 4,821,029 | 4/1989 | Logan et al. | 340/721 |
| 4,896,291 | 1/1990 | Gest et al. | 340/735 |

*Primary Examiner*—Ulysses Weldon
*Assistant Examiner*—Doon Chow
*Attorney, Agent, or Firm*—Nixon & Vanderhye

[57] ABSTRACT

In a portable terminal device of the invention, when a menu key provided on a keyboard is depressed by an operator, a copy/move menu is displayed on a display area under the control of a CPU which detects this depression. Then, the CPU determines which is specified as data to be copied or moved, a set of data displayed on the display area or part of the set of data. The specified data is input to a transfer buffer, and a copy or move process is executed. In a case where an insert process is selected for inserting the data stored in The transfer buffer into another display position, the transfer data is transferred to an input buffer, so as to copy or move the transfer data to the other position.

8 Claims, 6 Drawing Sheets

FIG. 2

[TELEPHONE]
TARO TOKYO
☎ 03(3456) 7890

〒100

CHIYODA-KU, TOKYO

PRESIDENT OF BUSINESS
CONNECTING COMPANY

| V | ∧ |

FIG. 3

[TELEPHONE]
TARO TOKYO
☎ 03(3456) 7890

〒100

CHIYODA-KU, TOKYO

PRESIDENT OF BUSINESS
CONNECTING COMPANY

| V | ∧ |

PORTABLE TERMINAL DEVICE

BACKGROUND OF THE INVENTION

1. Field of the Invention

The present invention relates to a portable terminal device such as an electronic pocket organizer.

2. Description of the Prior Art

Electronic pocket organizers have been developed as an alternative to a pocket diary and is suitable for an information era. An example of such an electronic pocket organizer has functions capable of copying and moving a set of data (i.e., a set of data in a telephone book including personal data items such as name, telephone number, zip code, address, and note (place of work, position)) which is displayed on a liquid crystal display area.

The term "copy" represents a process in which a set of data or a character string such as a telephone number included in the set of data displayed on the display area can be copied to another display position. Specifically, data to be copied is first transferred to a transfer buffer associated with a CPU which serves as a control center for the electronic pocket organizer. Then, the data stored in the transfer buffer is inserted into another display position.

The term "move" represents a process in which a set of data or a character string displayed on the display area and to be moved is first transferred to the transfer buffer, and then is deleted from the display area. Then, the data stored in the transfer buffer is inserted into another display position.

In the copy and transfer processes of the prior art, a keyboard or the like of the electronic pocket organizer was initially operated so as to select a copy operation or a move operation, and then data to be copied or moved was specified.

The above-mentioned procedure is conducted inversely to the normal thought process of a human being in which data to be copied or moved would be initially specified and then a copy operation or a move operation would be selected. Accordingly, the operability of the devices is poor and an operation mistake is likely to occur.

SUMMARY OF THE INVENTION

The portable terminal device of this invention, which overcomes the above-discussed and numerous other disadvantages and deficiencies of the pilot art, comprises: input means for receiving information data and commands from an operator; a RAM for storing information data and area data; a display area for displaying information data in an information data portion and menu selections in a menu selection portion; control means for getting area data indicative of the location of an identified area on said display, for storing said area data in said RAM, and for displaying said identified area in a particular manner; and processing means for sequentially permitting an area of information data to be selected from the information data portion and then a function to be selected from the menu selection portion, for determining whether there exists the selected area of information data from said area data, for, if YES, processing the selected area of the information data in accordance with the selected function, and for, if NO, processing the whole information data in accordance with the selected function.

In another aspect of the invention, a portable terminal device, comprises: input means for receiving information data and commands from an operator; a RAM for storing information data and area data; a display area for displaying information data in an information data portion and menu selections in a menu selection portion; a touch panel substantially covering said menu selection portion and at least part of said information data portion of said display area; control means for causing said touch panel to output area data indicative of the location of an identified area on said display, for storing said area data in said RAM, and for displaying said identified area in a particular manner; and processing means for sequentially permitting an area of information data to be selected from the information data portion and then a function to be selected from the menu selection portion, for identifying the selected area of the information data and the selected function from said area data, and for processing the selected area of the information data in accordance with the selected function.

In another aspect of the invention, a data processing method for a portable terminal device, comprising the steps of: receiving information data and commands from an operator; displaying information data in an information data portion and menu selections in a menu selection portion; getting area data indicative of the location of identified area of information data in the information portion on said display; storing said area data; displaying said identified area in a particular manner; allowing a function to be selected from the menu selection portion; and determining whether there exists an identified area of information data from said area data, if there exists an identified area, then processing the identified area of the information data in accordance with the selected function, else, processing the whole information data in accordance with the selected function.

With the above-mentioned construction, after selecting information data from the information data portion, the operator selects a function from the menu selection portion. If there exists a reverse-video area of information data identified by operating the touch panel, the identified area of the information data is copied or moved by processing means in accordance with the selected function. If the touch panel is not operated, the display remains normal. In this case, the processing means copies or moves the whole information data in accordance with the selected function. Therefore, according to the invention, data to be copied or moved is first identified, and then the identified data is processed for copy or move.

Thus, the invention described herein makes possible the objective of providing a portable terminal device in which data can be copied or moved in an operation procedure similar to the thought process sequence, and consequently, the operability can be significantly enhanced.

BRIEF DESCRIPTION OF THE DRAWINGS

This invention may be better understood and its numerous objects and advantages will become apparent to those skilled in the art by reference to the accompanying drawings as follows:

FIG. 2 shows an example of a screen of a display area of the electronic pocket organizer according to the invention.

FIG. 3 shows an example of a screen of the display area of the electronic pocket organizer according to the invention.

DESCRIPTION OF THE PREFERRED EMBODIMENTS

Figure 1:
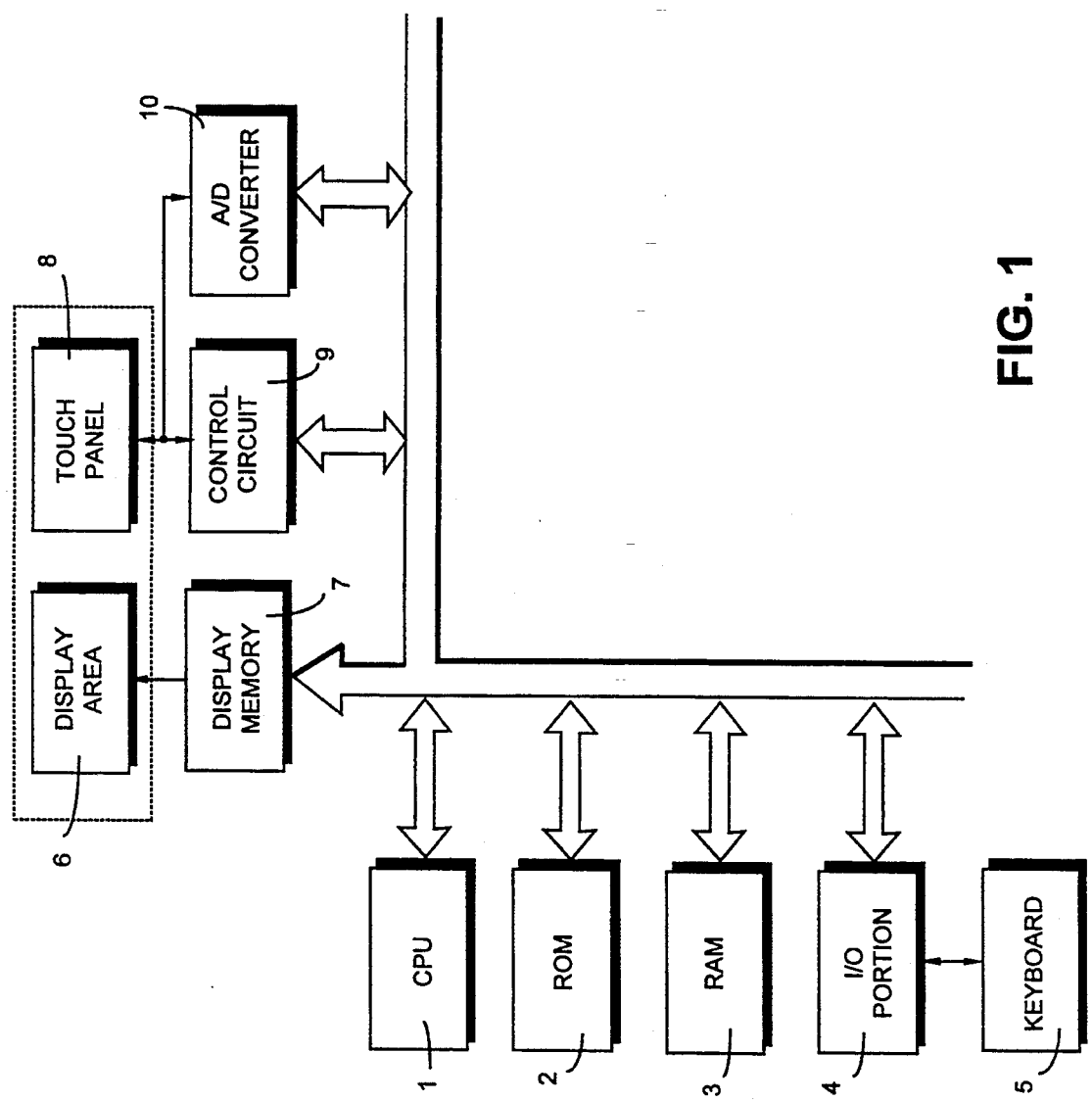
FIG. 1 is a block diagram showing circuitry of an electronic pocket organizer according to the invention.

FIG. 1 shows a block diagram of circuitry of an electronic pocket organizer according to the present invention. A CPU 1 serves as a control center of the electronic pocket organizer, and controls various processes such as a copy process and a move process which are described below in accordance with control programs stored in a ROM 2. During the processes, various data are written into and read from a RAM 3.

The CPU 1 waits for a key input by an operator. In other words, when the operator depresses a corresponding key of a keyboard 5, information related to the depressed key is input to the CPU 1 through an I/O portion 4.

When the operator inputs a set of personal data including five items of name, telephone number, zip code, address, and notes from the keyboard 5, the input data is first written into the RAM 3, and then read out to be written into a display memory 7 under the control of the CPU 1. The data in the display memory 7 is displayed on a liquid crystal display area 6 by a command from the CPU 1.

A touch panel 8 is attached to the display area 6 so as to cover this area. The touch panel 8 is made of a transparent analog resistive film so that the data displayed on the display area 6 can be seen through the touch panel 8. A control circuit 9 is connected to the touch panel 8 for controlling the voltage application to the touch panel 8, etc. When the operator drags a finger or the like on the touch panel 8, the control circuit 9 commands the touch panel 8 to output the information indicative of the position of the dragged area as an analog signal. An A/D converter 10 converts the analog signal into a digital signal accessible by the CPU 1. The CPU 1 interprets the digital signal into a command signal. The control circuit 9 causes the data corresponding to the dragged area to be displayed on the display area 6 in reverse video from the command signal of CPU 1.

Figure 5:
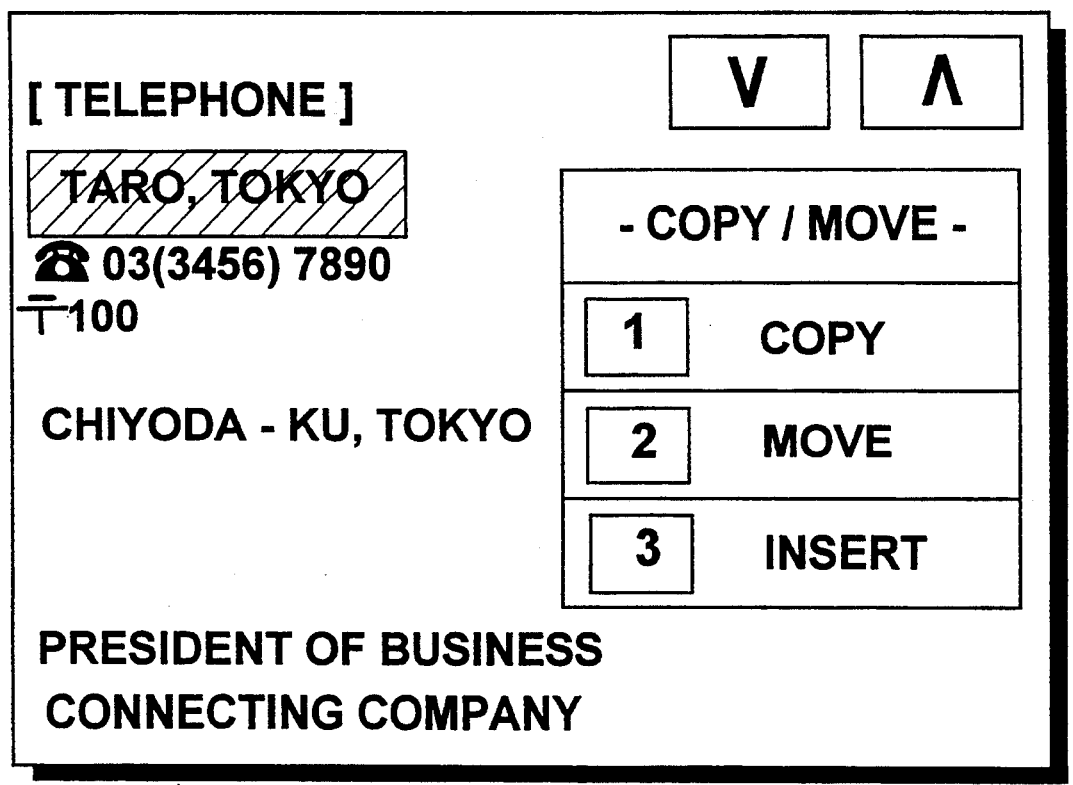
FIG. 5 shows an example of a screen of the display area of the electronic pocket organizer according to the invention.

FIGS. 2, 3 and 5 show examples of the screen of the display area 6. On the screen of FIG. 2, a set of data described above is displayed. In FIG. 2, the data category "telephone book", name of a person "Taro TOKYO", telephone number "03(3456)7890", zip code " 〒100", address "Chiyoda-ku, Tokyo" and notes "President of business connecting company" are displayed in this order from the top of the display area 6 in a left-justified manner.

FIG. 3 shows a screen after the operator drags a finger to a character string of the name "Taro TOKYO" in FIG. 2. The dragged area "Taro TOKYO", i.e., the hatched area in FI. 3, is displayed in reverse video.

Figure 4:
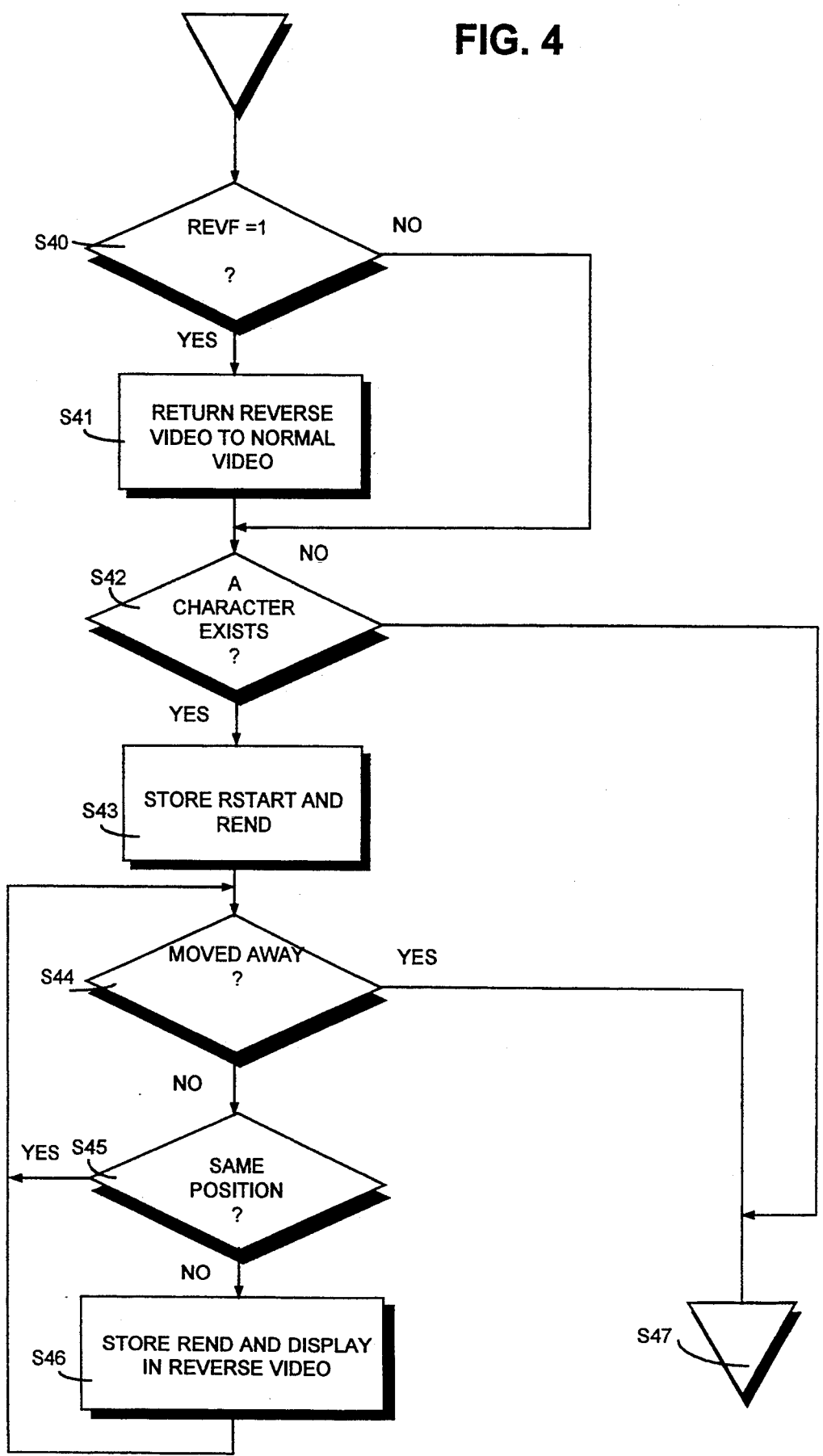
FIG. 4 is a flowchart of the operation of a CPU of the electronic pocket organizer according to the invention.

FIG. 4 is a flowchart illustrating a control procedure for a reverse-video process in which after the operator drags the finger on the touch panel 8, the characters displayed in an area on the display area 6 corresponding to the dragged area are displayed in reverse video. In FIG. 4, REV flag, RSTART, and REND are variables stored in the RAM 3.

In step S40, the CPU 1 Judges whether or not the REV flag is set to "1". The REV flag of "1" indicates that a character string in reverse video is displayed on the display area 6. The REV flag of "0" indicates that a character string in reverse video is not displayed on the display area 6.

Only when the CPU I determines in step S40 that the REV flag is set to "1", will the display of the character string in reverse video be changed back to normal display (step S41).

In step S42, when the operator drags the finger on the touch panel 8, the CPU 1 Judges whether there exist characters displayed in an area on the display area 6 corresponding to the dragged area on the touch panel 8 or not.

If Yes, the information indicative of the position of the characters on the display area 6 (i.e., the item code and the offset from the starting point of the item) corresponding to the position touched by the finger of the operator on the touch panel 8, is stored in RSTART and REND, respectively, under the control of the CPU 1 (step S43). For example, in the case of FIG. 3, an item code corresponding to the name and a "1" indicating the offset from the starting point of the item ("1" indicates the starting point) are stored in RSTART and REND, respectively. At this time, the characters displayed in the corresponding area of the display area 6 are displayed in reverse video under the control of the CPU 1.

If No in step S42, the process advances to step S47 in which the reverse-video process is terminated.

Next, in step S44, it is detected whether or not the finger of the operator has moved away from the touch panel 8. If Yes, the process proceeds to step S47 in which the reverse-video process is terminated. If No, it is detected whether the finger of the operator is in the same position on the touch panel 8 as previously or not.

If Yes, the process returns to step S44. If No, now that the finger of the operator is being dragged across the touch panel 8, the information indicative of the position of the characters on the display area 6 corresponding to the position touched by the finger of the operator on the touch panel 8 is stored in REND, and the character string specified by RSTART and REND is displayed in reverse video under the control of CPU I (step S46).

FIG. 5 shows a screen when a copy/move menu is selected by depressing a corresponding key of the keyboard 5, and the menu is displayed on the screen of FIG. 3. In the right portion of the display area 6, the menu name "copy/move", menu No. 1 "copy", menu No. 2 "move", and menu No. 3 "insert" are displayed in this order from the top of the display area 6. The menu No. 3 "insert" is displayed only when the copy or move process is executed.

Figure 6:
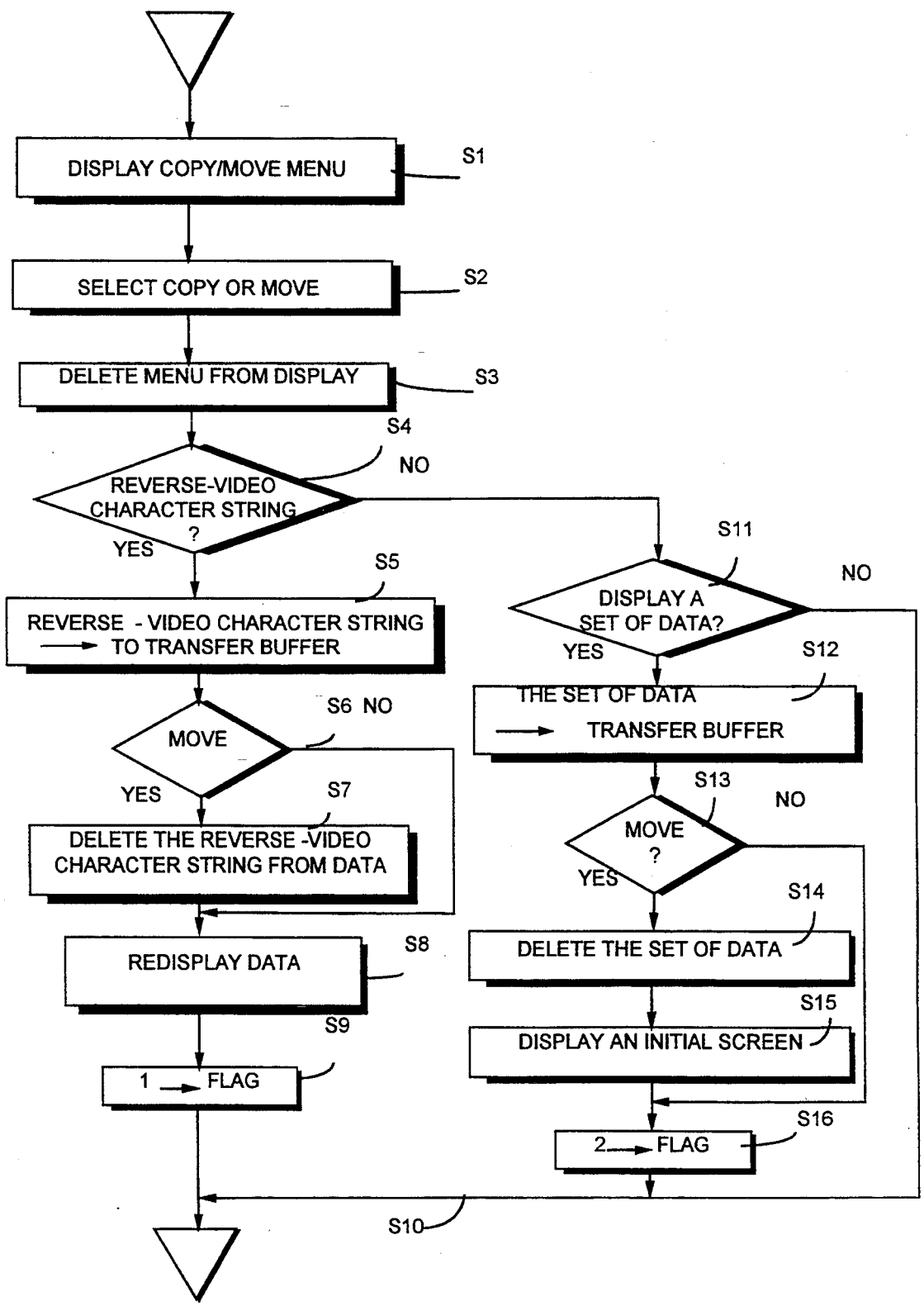
FIG. 6 is a flowchart illustrating a control procedure of the CPU when a copy/move menu is selected according to the invention.

Next, referring to FIG. 6, the control procedure of CPU i when the copy/move menu is selected is described. When the corresponding menu key of the keyboard 5 is depressed by the operator, the copy/move menu is displayed on the display area 6 as shown in FIG. 5 under the control of the CPU I in step S1. Prior to this, in the left portion of the display area 6, a set of data has been read out from the display memory 7 and displayed as shown in FIG. 2. When the CPU 1 detects that the operator drags a finger or the like in an area on the touch panel 8 corresponding to the display area of "copy" or "move" of the copy/move menu displayed on the display area 6, or when the CPU 1 detects that the numeric key "1" or "2" of the keyboard 5 is depressed (the numeric key "1" is depressed for copy operation and the numeric key "2" is for move operation), the CPU 1 determines that the menu is selected (step S2) and the display of copy/move menu is deleted (step S3).

The position of the dragged area of the touch panel 8 is detected based upon the signal from the A/D converter 10, and the depression of the numeric key "1" or "2" is detected from the signal from the I/O portion 4, as described above.

In step S4, it is judged whether or not there exists a reverse-video character string on the display area 6, based on the variables RSTART and REND stored in the RAM 3. If it is judged that a reverse-video character string exists, the reverse-video character string is transferred from the display memory 7 to a transfer buffer which is associated with the display memory 7 in step S5. Then, in step S6, it is judged whether the menu selected in step S2 is the move menu or not. If Yes, the CPU 1 executes a move process in which the reverse-video character string transferred to the transfer buffer is deleted from the displayed data (step S7).

Next, in step S8, the data is displayed again on the display area 6. At this time, since the reverse-video character string has been deleted, the character string is not displayed. On the other hand, if it is judged in step S7 that the copy menu is selected, the move process is not executed and the data including the reverse-video character string transferred to the transfer buffer is displayed (step S8). The redisplay process of step S8 is over and the flag is set to "1" in step S9. The flag of "1" indicates that a character string is stored in the transfer buffer. Then, the process proceeds to step S10 where a next process such as an insert process, which is described below, is executed.

If it is judged in step S4 that there is no reverse-video character string on the display area 6, the process advances to step S11 in which it is judged whether or not a set of data is displayed. When it is judged that a set of data is not displayed on the display area 6 (the screen in such a state of the display area 6 is referred to as an initial screen), in other words, when a set of data has not been read from the RAM 3 yet or the electronic pocket organization is set in a state which allows the operator to input characters, the process advances to step S10 in which a next process is executed.

When it is judged that a set of data is displayed, the set of data is transferred to the transfer buffer in step S12. In step S13, it is judged whether or not the move menu is selected. If Yes, the move process is executed in which the set of data displayed on the display area 6 is deleted. Next, the initial screen is displayed in step S15, and then the flag is set to "2" in step S16. The flag of "2" indicates that a set of data is stored in the transfer buffer. After step S16, the process proceeds to step S10 in which a next process is executed.

If it is determined that the copy menu is selected in step S13, the process proceeds to step S16 in which the flag is set to "2". Then, the process advances to step S10.

Figure 7:
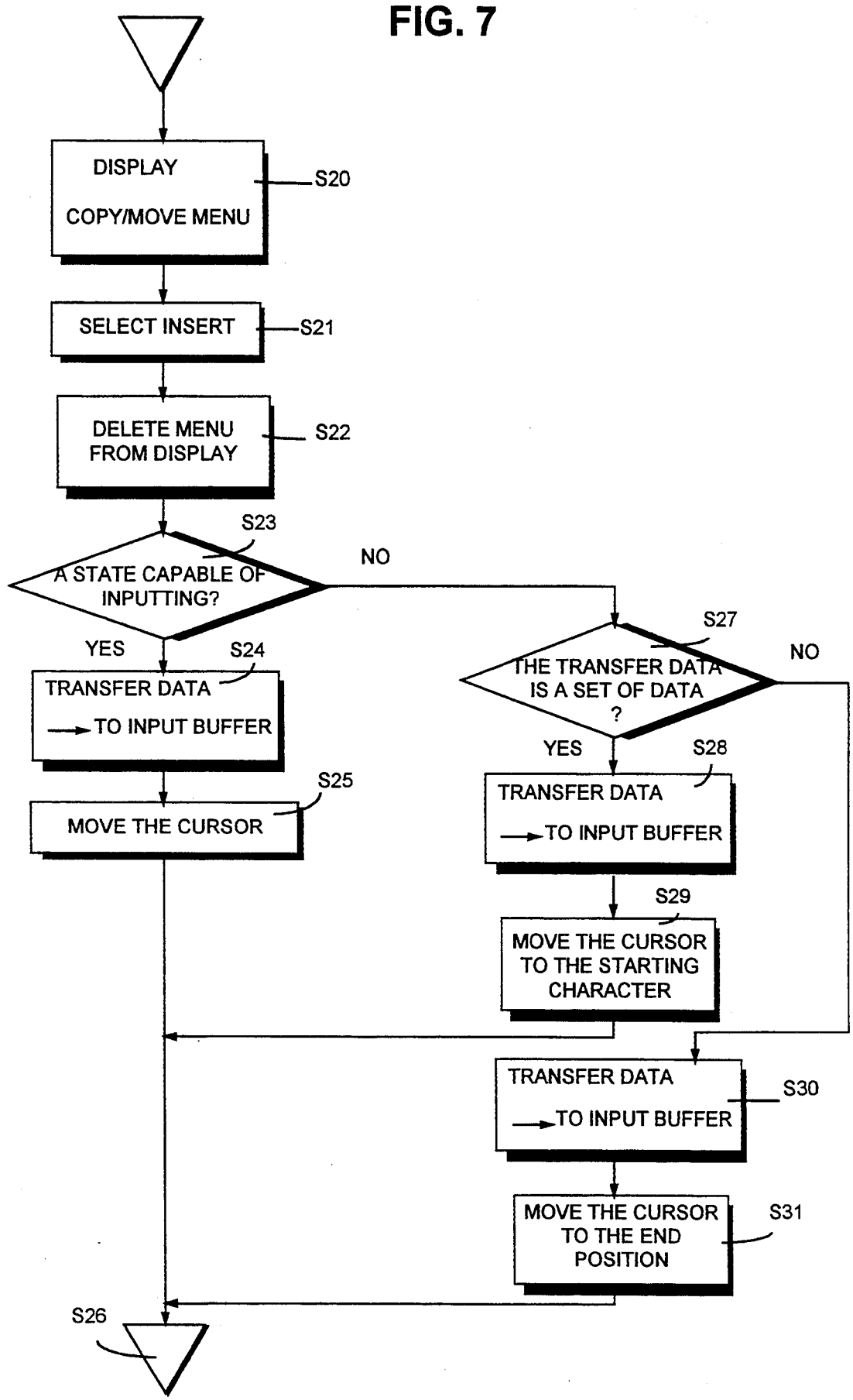
FIG. 7 is a flowchart illustrating a control procedure for an insert process of the CPU according to the invention.

Next, referring to FIG. 7, the control procedure for a data insert process of the CPU 1 after step S10 is described. When the CPU 1 detects that the copy/move menu is selected by depressing the corresponding key, the CPU 1 determines the state of the flag. If it is determined that the flag is set to "1" or "2", i.e., that a character string or a set of data is stored in the transfer buffer, the "copy/move" menu shown in FIG. 5 is displayed on the display area 6. Then, after it is detected that the menu No. 3 "insert" is selected by operating the touch panel 8 or by depressing the numeric key "3" (step S21), the menu display is deleted in step S22.

Next, in step S23, the CPU 1 judges whether or not the electronic pocket organizer is in a state which allows the operator to input characters. When the electronic pocket organizer is in that state, the characters input by the operator are sequentially stored in an input buffer associated with the display memory 7. A cursor indicative of the position at which a character can be input is displayed on the display area 6.

If Yes in step S23, the data stored in the transfer buffer is transferred to a position in the input buffer corresponding to the position of the cursor displayed on the display area 6 in step S24. The data stored in the input buffer is then transferred to the display memory 7 and displayed on the display area 6 by the command of the CPU 1. In this way, the data stored in the transfer buffer can be inserted at the position of the cursor displayed on the display area 6.

After inserting the data in step S24, the CPU 1 moves the cursor adjacent the inserted character string (step S25). Then, the process proceeds to step S26 in which a next process is executed.

If No in step S23, the CPU 1 judges whether or not the data stored in the transfer buffer is a set of data. This judgment is conducted by detecting the state of the flag. The flag of "2" indicates that the data stored in the transfer buffer is a set of data. The flag of "1" indicates that the data stored in the transfer buffer is a character string.

When the CPU 1 determines that the data stored in the transfer buffer is a set of data, the set of data is transferred to the input buffer (step S28).

The input buffer is divided into blocks for storing respective items of the set of data such as the name, telephone number, address, zip code, and notes. Codes for identifying the respective blocks are attached to the respective blocks.

The data transferred to the input buffer in step S28 is combined with data which exists in the input buffer before the transfer in a block-to block manner. Thereafter, the CPU 1 moves the cursor to a position corresponding to the starting position of the input buffer (step S29). Then, the process proceeds to step S26 in which a next process is executed.

When the CPU 1 determines in step S27 that the data stored in the transfer buffer is a character string, the character string is transferred to the input buffer (step S30). The character string transferred to the input buffer in step S30 is combined with the data which exists in the input buffer before the transfer depending on the block for the character string. The thus combined data is displayed on the display area 6. The CPU 1 moves the cursor to a position corresponding to the ending position of the input buffer (step S31). Then, the process advances to step S26 in which a next process is executed.

As described above, the term "insert" used in this embodiment represents a process for moving the data stored in the transfer buffer to the input buffer. The combination of "copy" and "insert" enables the data to be copied to another display position. The combination of "move" and "insert" enables the data to be moved to another display position.

According to the invention, the copy process and the move process can be performed in accordance with the operation procedure corresponding to the thought process of a human being. In other words, data to be copied or moved is initially specified and then the copy process or the move process for the data is selected. Therefore, the operability is enhanced and the operation mistake hardly occurs, thereby improving the convenience in use of the electronic pocket organizer of the invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A portable terminal device for storing, copying, moving, inserting and displaying information data according to a selected menu function, comprising:

input means for receiving information data and commands from an operator;

a RAM for storing information data and area data;

a display area for displaying information data in an information data portion and menu selections in a menu selection portion;

control means for getting area data indicative of the location of an identified area on said display, for storing said area data in said RAM, and for displaying said identified area in a manner distinguishable from a remaining portion of said display; and processing means for sequentially permitting an area of information data to be selected from the information data portion and then permitting a function to be selected from the menu selection portion, and for determining whether there exists the selected area of information data within said area data, and, if YES, processing the selected area of the information data in accordance with the selected function, and, if NO, processing the entirety of information data in accordance with the selected function.

2. A portable terminal device in accordance with claim 1, wherein said portable terminal device further comprises a touch panel substantially covering said menu selection portion and at least part of said information data portion of said display area, wherein said control means gets area data by causing said touch panel to output the area data.

3. A portable terminal device in accordance with claim 2, wherein said identified area is identified by the finger of an operator being dragged across said touch panel.

4. A portable terminal device in accordance with claim 1, wherein said control means causes the identified area to be displayed on said display area in reverse video.

5. A portable terminal device in accordance with claim 1, wherein said control means includes a control circuit and an A/D converter.

6. A portable terminal device in accordance with claim 1, wherein said processing means includes a CPU.

7. A data processing method for receiving, moving, copying, inserting and displaying information data in a portable terminal device, comprising the steps of:

receiving information data and commands from an operator;

displaying information data in an information data portion and menu selections in a menu selection portion;

getting area data indicative of the location of a user identified area of information data in the information portion of said display;

storing said area data;

displaying said identified area in a manner distinguishable from a remaining portion of said display;

allowing a function to be selected from the menu selected portion;

determining whether there exists an identified area of information data within said area data, and if there exists an identified area within said area data, then processing the identified area of the information data in accordance with the selected function, and processing the entirety of information data in accordance with the selected function if an identified area does not exist within said area data; and wherein said identified area of information data is identified by the finger of an operator being dragged across a touch sensitive panel.

8. A data processing method for a portable terminal device in accordance with claim 7, wherein said displaying step of displaying said identified area in a particular manner includes a step of displaying said identified area in reverse video.

* * * * *